(12) United States Patent
Taxak et al.

(10) Patent No.: US 11,691,584 B2
(45) Date of Patent: Jul. 4, 2023

(54) COMPOSITE STRUCTURES FOR FORMING VEHICLE BARRIER SYSTEMS

(71) Applicant: Zephyros, Inc., Romeo, MI (US)

(72) Inventors: Manish Taxak, Romeo, MI (US); Jignesh Desai, Romeo, MI (US); Satindar Dua, Romeo, MI (US); Sundarraman Vaideeswaran, Chennai (IN); Gajanan More, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 107 days.

(21) Appl. No.: 17/598,755

(22) PCT Filed: Apr. 16, 2020

(86) PCT No.: PCT/US2020/028440
§ 371 (c)(1),
(2) Date: Sep. 27, 2021

(87) PCT Pub. No.: WO2020/214769
PCT Pub. Date: Oct. 22, 2020

(65) Prior Publication Data
US 2022/0185213 A1    Jun. 16, 2022

Related U.S. Application Data

(60) Provisional application No. 62/947,047, filed on Dec. 12, 2019, provisional application No. 62/834,917, filed on Apr. 16, 2019.

(51) Int. Cl.
*B60R 19/56*    (2006.01)

(52) U.S. Cl.
CPC .................. *B60R 19/565* (2013.01)

(58) Field of Classification Search
CPC ....... B60R 19/565; B60R 19/56; B60R 19/42; B60R 19/02; B60R 19/18; B60R 2019/026; B60R 2019/1806
(Continued)

(56) References Cited

U.S. PATENT DOCUMENTS

| 5,730,485 A | 3/1998 | Sjostedt |
| 7,284,788 B1 | 10/2007 | Barbat et al. |

(Continued)

FOREIGN PATENT DOCUMENTS

| DE | 19913080 A1 | 9/2000 |
| EP | 0041413 A | 12/1981 |

(Continued)

OTHER PUBLICATIONS

European Second Communication Pursuant to Art. 94(3) dated Feb. 2, 2023, Application No. 20725736.1.

(Continued)

*Primary Examiner* — Joseph D. Pape
*Assistant Examiner* — Veronica M Shull
(74) *Attorney, Agent, or Firm* — The Dobrusin Law Firm, P.C.

(57) ABSTRACT

A reinforcement structure (10) comprising an inner member (14) at least partially secured within a shell (12), wherein the inner member is secured within the shell so that one or more abutment portions (18) of the shell are positioned in receiving portions (20) of the inner member, to create at least a partial press-fit condition between the inner member and the shell.

20 Claims, 7 Drawing Sheets

(58) Field of Classification Search
USPC .................................. 293/102, 120, 128
See application file for complete search history.

(56) References Cited

U.S. PATENT DOCUMENTS

| | | | | |
|---|---|---|---|---|
| 7,527,320 | B1 * | 5/2009 | Nevell, Jr. | ............ B60R 19/445 |
| | | | | 293/128 |
| 7,766,403 | B2 | 8/2010 | Alversson et al. | |
| 7,810,858 | B2 * | 10/2010 | Frederick | ................ B60R 19/18 |
| | | | | 293/121 |
| 8,740,268 | B2 * | 6/2014 | Ebara | ..................... B60R 19/26 |
| | | | | 293/121 |
| 8,936,285 | B2 * | 1/2015 | Inoue | ..................... B60R 19/18 |
| | | | | 293/133 |
| 9,623,820 | B2 | 4/2017 | Kawanabe et al. | |
| 10,570,258 | B2 | 2/2020 | Richardson et al. | |
| 11,110,670 | B2 | 9/2021 | Richardson et al. | |
| 2009/0206618 | A1 * | 8/2009 | Ralston | ................... B60R 19/18 |
| | | | | 293/120 |
| 2010/0109353 | A1 * | 5/2010 | Allen | ..................... B60R 19/18 |
| | | | | 293/120 |
| 2012/0043019 | A1 | 2/2012 | Belpaire | |
| 2015/0129116 | A1 | 5/2015 | Richeton et al. | |
| 2018/0036970 | A1 | 2/2018 | Chmielewski et al. | |
| 2020/0157293 | A1 | 5/2020 | Chmielewski et al. | |
| 2021/0053625 | A1 | 2/2021 | Richardson | |
| 2021/0237377 | A1 | 8/2021 | Richardson | |
| 2022/0080912 | A1 | 3/2022 | Barz | |
| 2022/0097776 | A1 | 3/2022 | Royston | |

FOREIGN PATENT DOCUMENTS

| | | |
|---|---|---|
| EP | 1882615 A2 | 1/2008 |
| FR | 3064228 A1 | 9/2018 |
| JP | H11-34140 A | 2/1999 |
| JP | 2008189273 A | 8/2008 |
| KR | 2016/0080161 A | 7/2016 |
| WO | 2017/199675 A1 | 11/2017 |
| WO | 2020/198139 A1 | 10/2020 |
| WO | 2020/205192 A1 | 10/2020 |
| WO | 2021/080917 A1 | 4/2021 |

OTHER PUBLICATIONS

European Search Report dated Aug. 18, 2022, Application No. 20725736.1.
International Search Report dated Jun. 11, 2020, PCT Application No. PCT/US2020/028440.

* cited by examiner

COMPOSITE STRUCTURES FOR FORMING VEHICLE BARRIER SYSTEMS

FIELD

The present invention generally relates to vehicle barrier systems, and more particularly, to composite structures forming vehicle barrier systems.

BACKGROUND

Transportation vehicles frequently utilize structural members to form, support, reinforce, or a combination thereof certain vehicle structures. Unfortunately, such members tend to be formed of relatively heavy materials such as metal, adding undesirable weight to the vehicle. For some applications, it has become popular in recent years to employ a composite structure as part of the reinforcement. However, these materials may often still add significant weight and can be costly and time consuming to manufacture. Moreover, the materials used to form the structural members may be structurally deficient when compared to the conventional heavier materials, resulting in a weaker structure unable to withstand a desired load, unable to perform properly, or both. Additionally, it may be difficult to provide sufficient structural support to certain vehicle structures using more lightweight materials, thereby increasing the risk of damage or breakage of the structural members, the vehicle structures being supported by the structural members, or both.

One particular vehicle reinforcement provides a protective barrier along an underbody of a vehicle. The reinforcing structure may be attached to an underrun along a front portion, a rear portion, a side portion, or a combination thereof of a vehicle to prevent an additional vehicle from being compressed beneath the vehicle's underbody during a collision (i.e., to prevent "submarining"). The reinforcing structure may provide a crumple zone the gradually stops the additional vehicle before it reaches the clearance gap between the vehicle and the ground. However, the barrier structures are frequently derived using similar techniques and materials as illustrated above.

Examples of vehicle barrier structures may be found in U.S. Pat. Nos. 7,284,788; 7,766,403; and 9, 623, 820, all of which are incorporated herein for all purposes. There remains a need for an improved vehicle barrier structure. What is needed is a barrier structure formed using one or more lightweight composite materials. There remains a need for a barrier structure that is lightweight yet provides sufficient structural integrity. What is needed is a barrier structure having one or more interlocked members that provide sufficient strength. Additionally, there remains a need for a barrier structure that is simple to manufacture and cost effective. What is needed is a barrier structure free of secondary adhesives, fasteners, or both that secured components of the barrier structure together.

SUMMARY

The present teachings meet one or more of the present needs by providing: a reinforcement structure comprising an inner member at least partially secured within a shell, wherein the inner member is secured within the shell so that one or more abutment portions of the shell or inner member are positioned in receiving portions of the inner member or shell, respectively, to create at least a partial press-fit condition between the inner member and the shell.

The present teachings meet one or more of the present needs by providing a reinforcement structure, wherein: the inner member includes one or more cavities formed by one or more walls of the inner member; the inner member includes one or more ribs projecting from the one or more walls to further define the one or more cavities; the reinforcement structure further includes one or more brackets secured to the shell, the one or more brackets including one or more projections configured to mount the reinforcement structure to one or more additional structures; the shell further includes a plurality of retaining features that contact an outer surface of the inner member to maintain the press-fit condition between the shell and the inner member; the retaining features are a plurality of undulations along an inner surface of the shell; the shell is a monolithically formed, enclosed structure having opposing openings at terminal ends of the shell; the shell further includes one or more notches recessed from an outer surface of the shell; the shell and the inner member are co-pultruded or co-extruded; the shell and the inner member are extruded separately and the inner body is inserted into the shell to create the press-fit condition; the shell and the inner member are pultruded; the reinforcement structure is an underrun protection device for a vehicle; the shell and the inner member are dissimilar composite materials; the shell and the inner member have substantially similar compositions; the one or more ribs is a single rib extending between opposing walls of the inner member to form a pair of cavities; the shell, the inner member, or both are a fiber-reinforced composite material; the fiber-reinforced composite material contains one or more adhesive components; the shell and the inner member are secured to one another free of fasteners, welds, or both; the shell and the inner member are secured to one another free of an adhesive layer disposed between the shell and the inner member; the inner member is a thermoactivated composite material; the inner member is further secured to the shell by a male portion of the shell or the inner member being positioned within a female portion of the inner member or shell, respectively; the male portion is a finger secured and the female portion is a channel; the male portion and the female portion are co-extruded; or any combination thereof.

The present teachings meet one or more of the present needs by providing an improved vehicle reinforcement structure. The present teachings meet one or more of the present needs by providing: a barrier structure formed using one or more lightweight composite materials; a barrier structure that is lightweight, yet provides sufficient structural integrity; a barrier structure having one or more interlocked members that provide sufficient strength; a barrier structure that is simple to manufacture and cost effective; and a barrier structure free of secondary adhesives, fasteners, or both that secured components of the barrier structure together.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein are directed toward a reinforcement structure. The reinforcement structure may function to reinforce a vehicle. The reinforcement structure may function as a barrier to prevent unwanted objects or additional vehicles from being trapped beneath the vehicle. The reinforcement structure may be positioned along an underbody or underrun of a vehicle. The reinforcement structure may be secured to one or more additional structures of the vehicle. For example, the reinforcement structure may be secured to the chassis of a vehicle. The reinforcement structure may be positioned within a clearance gap of a vehicle. The clearance gap may be defined as a distance between the underbody of the vehicle and the ground in which the vehicle is supported by. The reinforcement structure may be any desired size and shape. For example, the reinforcement structure may have a length substantially similar to a width or length or a front, rear, side, or a combination thereof of a vehicle. The reinforcement structure may have any desired height. The height may be selected to decrease the clearance gap of the vehicle. The height may be selected based on the vehicle being reinforced. The reinforcement structure may be made of one or more materials. The reinforcement structure may have one or more components. The reinforcement structure may be monolithically formed. The reinforcement structure may be configured to increase structural integrity. For example, the reinforcement structure may be configured to compress or crumple a desired amount. The reinforcement structure may crumple about 25 mm or more, about 50 mm or more, or about 75 mm or more. The reinforcement structure may crumple about 150 mm or less, about 125 mm or less, or about 100 mm or less. The crumple zone of the reinforcement structure may decrease penetration of one or more additional vehicles beneath the reinforced vehicle during a collision. As a result, the one or more additional vehicles may be prevented from submarining underneath the reinforced vehicle.

The reinforcement structure may be substantially lighter than conventional barriers. The reinforcement structure may be about 10% lighter or more, about 30% lighter or more, or about 50% lighter or more than conventional barriers. The reinforcement structure may be about 90% lighter or less, about 75% lighter or less, or about 60% lighter or less. The reinforcement structure may weigh about 20 kilograms or more, about 40 kilograms or more, or about 60 kilograms or more. The reinforcement structure may weigh about 100 kilograms or less, about 80 kilograms or less, or about 70 kilograms or less.

The reinforcement structure may include a shell. The shell may function encase one or more additional components of the reinforcement structure. The shell may function to contact the one or more additional vehicles during a collision. The shell may be a single monolithically formed (i.e., integrally formed) structure. The shell may have a plurality of pieces. For example, the shell may be a clamshell having opposing portions secured to one another. The shell may be fully or partially enclosed. For example, the shell may be enclosed a full 360 degrees around a longitudinal axis of the shell and have openings at opposing ends of the shell. The shell may be partially enclosed. The shell may be enclosed about 180 degrees or more, about 225 degrees or more, or about 270 degrees or more. The shell may be enclosed about 360 degrees or less, about 305 degrees or less, or about 275 degrees or less. The shell may be hollow. The shell may contain one or more cavities. The shell may be any desired size and shape.

The shell may have one or more surfaces. The surfaces may include one or more projections, one or more arcuate portions, one or more planar portions, one or more curves, one or more bends, one or more steps, one or more undulations, one or more bumps, one or more grooves, one or more flanges, or a combination thereof. The shell may include one or more attachment means to secure the reinforcement structure to a vehicle. The shell may be free of attachment means. The shell may include one or more holes, one or more cutouts, or both. The shell may include one or more faces.

The shell may be structurally rigid. The shell may be flexible. The shell may have one or more localized flexible joints that allow flexing of the shell only at desired locations. The shell may be compressible. The shell may be elastic so that, upon flexing, the shell may return to an original position free of inelastic deformation. The shell may be structurally rigid to support a desired load. For example, the shell may support about 25 kilograms or more, about 50 kilograms or more, or about 75 kilograms or more. The shell may support about 175 kilograms or less, about 150 kilograms or less, or about 125 kilograms or less.

The shell may include one or more notches. The notches may function to secure the attachment means to one or more additional structures of a vehicle. The notches may receive one or more engaging mechanisms of the vehicle to secure the reinforcement structure. The notches may be located anywhere along an outer surface of the shell. The notches may be any size and shape. The notches may be recessed from the outer surface of the shell. The notches may be shaped uniformly or may have differing shapes. The notches may be monolithically formed with the shell. The notches may be a secondary operation, such as a stamping operation, that forms the notches.

The shell may include a recess. The recess may function to abut a surface of a structure that the reinforcement structure is configured to reinforce. The recess may extend inwardly into the reinforcement structure from an outer surface of the shell. The recess may be substantially shaped to receive a complimentary shape of a structure. For example, the recess may be shaped substantially similar to a projection of a structure so that, once the reinforcement structure is secured to the secondary structure, the projection is received by the recess to form a substantially flush mating condition. Thus, it is contemplated that the recess may be any desired size and/or shape. Additionally, the recess may be monolithically (i.e., integrally) formed with the shell.

The shell may be formed using one or more materials. The shell may be formed of a moldable material. The shell may be an extruded material. The shell may be a pultruded material. The shell may be an injection-molded material. The shell may be a composite material. The shell may be a polymeric material, a polyamide material, or both. The polymeric material may be a reinforced polymeric material. For example, the polymeric material may be a glass fiber reinforced polyamide. The polymeric material may be a thermoset material. The polymeric material may be a thermoplastic material. The polymeric material may be a thermoplastic epoxy material. The polymeric material may be a fiber reinforced thermoplastic epoxy material. The shell may be any material that may provide structural reinforcement to a vehicle structure, one or more vehicle components, or both.

The shell may at least partially house an inner member. The inner member may function to reinforce the reinforcement structure. The inner member may function to absorb all or a portion of an impact during a collision. The inner member may have a shape similar to the shell or may be different. The inner member may be a solid member or may be substantially hollow. The inner member may include one or more faces, one or more planar portions, one or more arcuate portions, or a combination thereof.

The inner member may be at least partially secured within the shell. The inner member may be secured within the shell via one or more fasteners, one or more adhesives, or both. Alternatively, the inner member may be secured within the shell free of one or more fasteners, one or more adhesive layers disposed between the shell and the inner member, or both. The inner member may create a press-fit condition with the shell. For example, a shape of the inner member may be substantially similar to a shape of an inner cavity of the shell so that the inner member abuts one or more interior walls of the shell and the one or more interior walls compressibly engages outer surfaces of the inner member.

The inner member may be secured to the shell using a mechanical interlock between the inner member and the shell. The mechanical interlock may include a male portion of either the inner member or the shell received and secured within a female portion of the shell or the inner member, respectively. For example, a male portion of the shell may extend into a female portion of the inner member to secure the shell to the inner member. The mechanical interlock may be any type of mechanical connection. However, it is contemplated that the mechanical interlock may include one or more fingers (i.e., a male portion) received by one or more channels (i.e., a female portion). The mechanical interlock may facilitate connection free of adhesives, secondary fasteners, or both.

The inner member may be formed using one or more materials. The inner member may be formed of a moldable material. The inner member may be an extruded material. The inner member may be a pultruded material. The inner member may be an injection-molded material. The inner member may be a composite material. The inner member may include one or more adhesive components. The inner member may be a polymeric material, a polyamide material, or both. The polymeric material may be a reinforced polymeric material. For example, the polymeric material may be a glass fiber reinforced polyamide. The polymeric material may be a thermoset material. The polymeric material may be a thermoplastic material. The polymeric material may be a thermoplastic epoxy material. The polymeric material may be a fiber reinforced thermoplastic epoxy material. The s inner member hell may be any material that may provide structural reinforcement to a vehicle structure, one or more vehicle components, or both. The inner member and the shell may have similar or dissimilar compositions.

The inner member may be formed via one or more walls. The walls may function to establish a shape of the inner member and support one or more components of a vehicle, a structure of the vehicle, the shell, or a combination thereof. The walls may define an outer dimension of the inner member. The walls may interconnect to form a shape of the inner member. For example, peripheral edges of the walls may connect to one another to form a substantially outer perimeter of the inner member. The walls may be an exterior surface of the inner member. The walls may vary in size and shape. The walls may have a uniform thickness. The walls may have one or more arcuate portions, one or more linear segments, or both. The walls may be integrally formed (i.e., monolithically formed as a single piece free of secondary adhesives or fasteners that connect the walls). The walls may at least partially enclose one or more ribs of the inner member.

The ribs may function to increase structural support of the inner member. The ribs may deflect, displace, or both an impact of the inner member, the shell, or both. The ribs may be dispersed throughout the inner member to provide increased structural integrity in one or more desired locations. The ribs may be a gusset, flange, or both.

The ribs may be interconnected. The ribs may extend between one or more walls of the inner member. The ribs may vary in size and shape. The ribs may include one or more arcuate portions, one or more linear segments, or both. The ribs may be at least partially housed between walls of the inner member. The ribs may abut one or more surfaces of the inner member. The ribs may be interconnected at any desired position, angle, or both.

The ribs, the walls, or both may interconnect to form one or more cavities of the inner member. The cavities may function to decrease weight of the inner member. The cavities may function to form deflection zones of the reinforcement structure. The cavities may function to house a secondary member. The cavities may extend through a thickness of the shell. The cavities may extend through an entire thickness of the shell, a partial thickness of the shell, or both. The cavities may vary in size and shape and may be any size and shape. The cavities may be formed from about two or more, about three or more, or about four or more ribs, walls, or both. The cavities may be formed from about seven or less, about six or less, or about five or less ribs, walls, or both. The cavity may receive one or more structural components, vehicle components, additional structural member components, or a combination thereof. A plurality of cavities may be located within the inner member.

The inner member may include one or more receiving portions. The receiving portions may function to receive abutment portions of the shell. The receiving portions may be shaped to substantially receive all or a portion of the abutment portions of the shell. The receiving portions may be positioned anywhere along the inner member. The receiving portions may be a notch, groove, recess, divot, hole, or a combination thereof. The receiving portion may include one or more engaging features. The one or more engaging features may be a hook, tooth, latch, finger, arm, clasp, or a combination thereof. The receiving portions may be monolithically formed with the inner member. The receiving portions may be positioned anywhere along the inner member. For example, the receiving portions may be positioned near terminal edges, corners, or both along an outer surface of the inner member. The receiving portions may be positioned to correspond with a position of the abutment portions when the inner member is secured within the shell.

The abutment portions may function to engage the receiving portions of the inner member. The abutment portions may function to create a press-fit condition between the shell and the inner member. The abutment portions may be a projection, flange, bump, undulation, extension, finger, tooth, arm, or a combination thereof. The abutment portions may be positioned anywhere along the shell. For example, the abutment portions may be positioned along an inner surface of the shell to mater with the receiving portions of the inner member. The abutment portions may be monolithically formed with the shell. The abutment portions may be compressible. The abutment portions may be structurally rigid. The abutment portions may be a male portion that engaged a female portion of the inner member. The abutment portions may be any size and shape.

The abutment portions may maintain a position of the inner member within the shell in conjunction with one or more retaining features of the shell. The retaining features may function to frictionally engaged an outer surface of the inner member. The retaining features may be positioned anywhere along an inner surface of the shell. The retaining features may be monolithically formed with the shell. The retaining features may be compressible or may be structurally rigid. The retaining features may be a bump, projection, undulation, extension, abrasive surface, or a combination thereof.

The reinforcement structure may include one or more brackets. The brackets may function to secure the reinforcement structure to the vehicle. The bracket may be secured to the shell, the inner member, or both. The brackets may be any size and shape. The brackets may be positioned anywhere along the reinforcement structure. The brackets may be secured to the reinforcement member using one or more fasteners, one or more adhesives, one or more additional mechanical interlocks, or a combination thereof. For example, the brackets may be welded to an outer surface of the shell. The brackets may include one or more planar portions, one or more arcuate portions, one or more bends, one or more gussets, one or more fillets, or a combination thereof. The brackets may include one or more holes for receiving one or more fasteners. The brackets may include one or more flanges to secure the brackets to the vehicle. The flanges may extend at any angle and have any size and shape.

The reinforcement structure may be further reinforced with one or more inserts. The inserts may function to improve structural integrity of the reinforcement structure. The inserts may provide local reinforcement to the reinforcement structure. The inserts may strengthen the reinforcement structure at one or more desired locations. The inserts may be positioned anywhere along the reinforcement structure. The inserts may be positioned between the shell and the inner member. The inserts may be secured to one or more outer surfaces of the reinforcement structure (i.e., not between the shell and the inner member). The inserts may extend along a portion of the length of the reinforcement structure. The inserts may extend along substantially an entire length of the reinforcement structure.

The inserts may be secured to the reinforcement structure using one or more mechanical fasteners, adhesives, or both. The inserts may be inserted before securing the shell to the inner member, after securing the shell to the inner member, or both. The inserts may also be co-extruded, co-pultruded, or both with the reinforcement structure.

The inserts may be positioned within one or more cavities of the reinforcement structure. The inserts may substantially or partially follow a contour of the one or more cavities. The inserts may include a bend, angle, step, leg, arm, flex-point, linear portion, contoured segment, or a combination thereof. The inserts may be made of a material substantially similar to the reinforcement structure. The inserts may be made of a secondary material to provide further variation to the reinforcement structure and its material properties. The material may be a metal, plastic (e.g., polyamide), or both.

Figure 1:
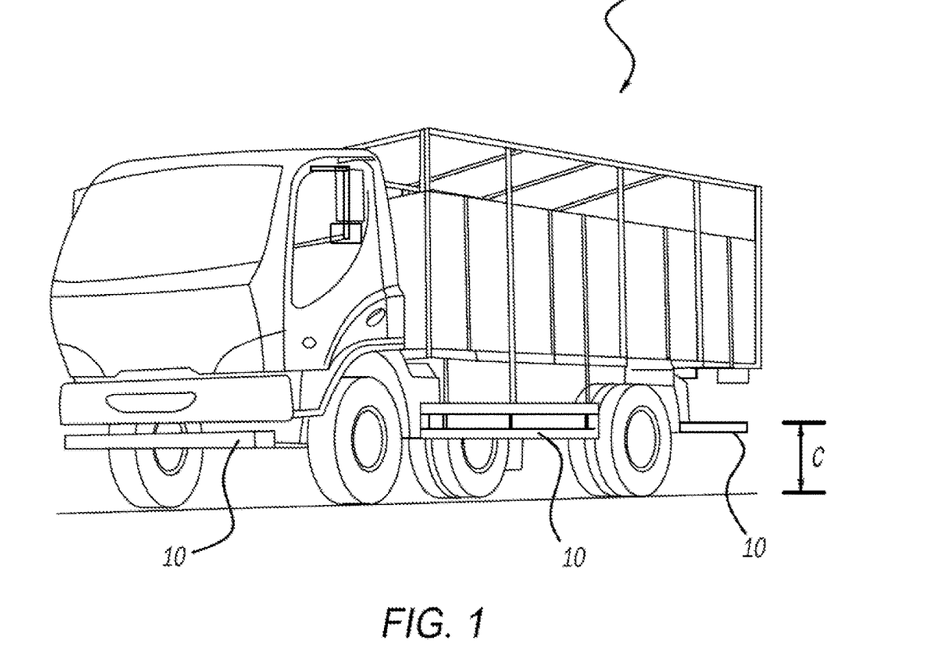
FIG. 1 is a perspective view of a vehicle having a plurality of reinforcement structures.

Turning now to the figures, FIG. 1 illustrates a perspective view of a vehicle 50. As illustrated, the vehicle 50 includes a plurality of reinforcement structures 10. The reinforcement structures 10 may be positioned along a front underbody, side underbody, rear underbody, or a combination thereof. The reinforcement structures 10 may be configured to decrease a clearance (C) between the vehicle 50 and the ground.

Figure 2:
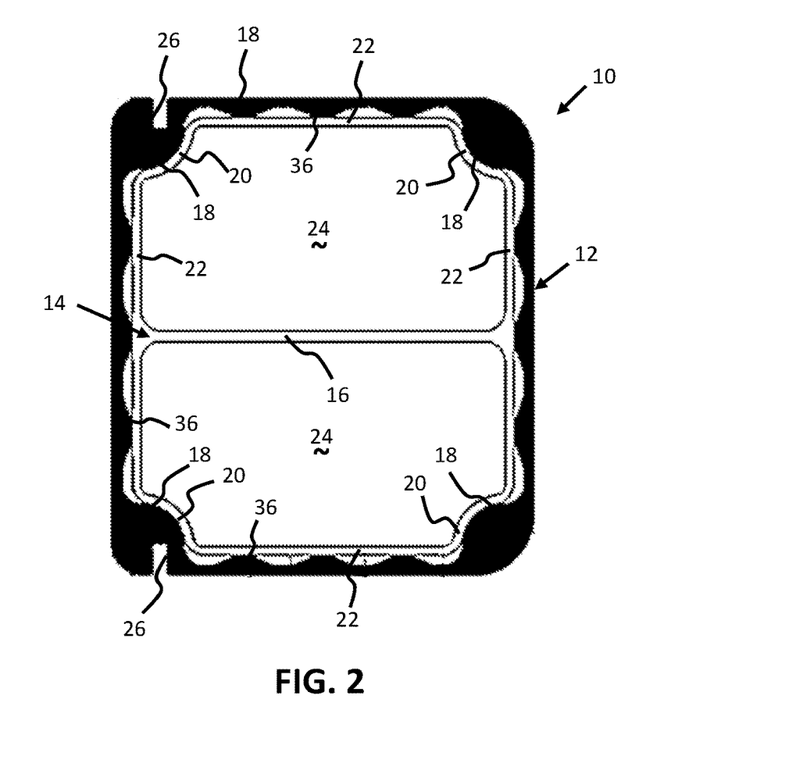
FIG. 2 is a cross-section of a reinforcement structure.

FIG. 2 illustrates a cross-section of a reinforcement structure 10. The reinforcement structure 10 includes an inner member 14 secured within the confines of a shell 12. The shell 12 includes a plurality of abutment portions 18 that abut corresponding receiving portions 20 of the inner member 14 and a plurality of notches 26. The shell 12 further includes a plurality of retaining features 36 that contact one or more walls 22 of the inner member 14. The abutment portions 18, alone or in conjunction with, the retaining features 36 may create a press-fit securement of the inner member 14 within the shell 12. The inner member 14 further includes a plurality of cavities 24 formed by adjoining the walls 22 and one or more ribs 16 of the inner member 14.

Figure 3:
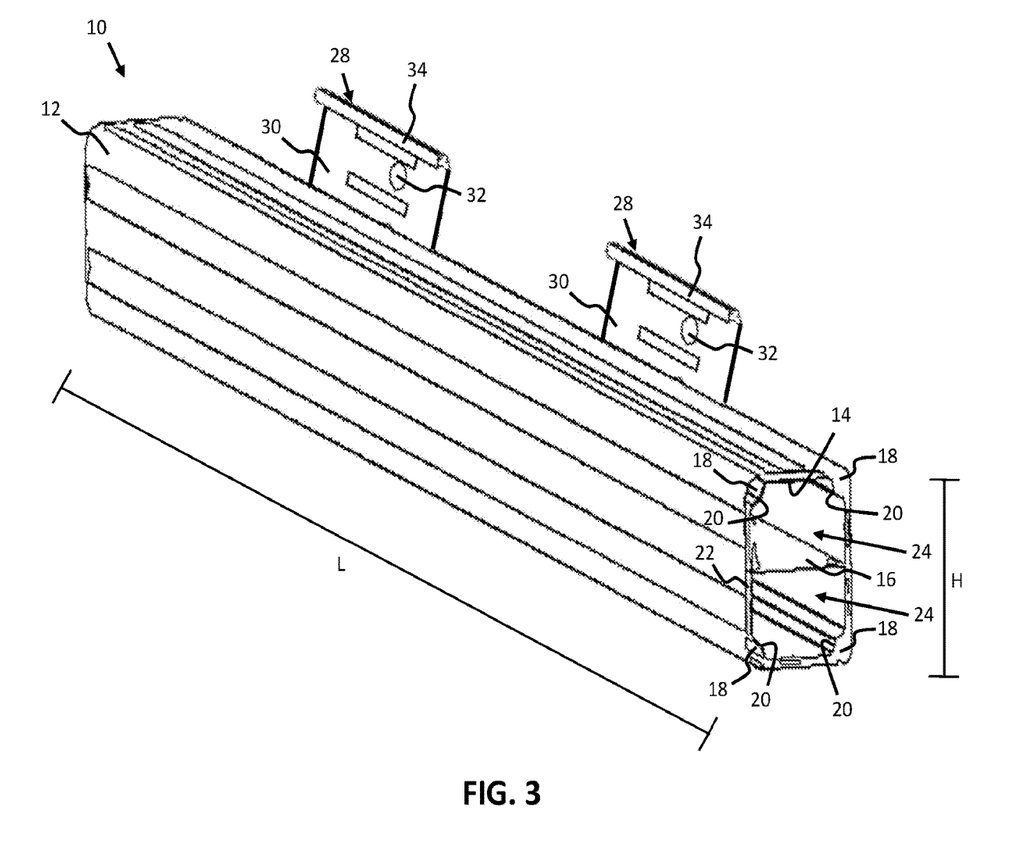
FIG. 3 is a perspective view of a reinforcement structure having a plurality of brackets.

FIG. 3 illustrates a perspective view of a reinforcement structure 10. The reinforcement structure 10 includes an inner member 14 secured within the confines of a shell 12. The shell 12 includes a plurality of abutment portions 18 that abut corresponding receiving portions 20 of the inner member 14. The shell 12 further includes a plurality of retaining features 36 that contact one or more walls 22 of the inner member 14. The abutment portions 18, alone or in conjunction with, the retaining features 36 may create a press-fit securement of the inner member 14 within the shell 12. The inner member 14 further includes a plurality of cavities 24 formed by adjoining the walls 22 and one or more ribs 16 of the inner member 14. As illustrated, a height (H) and length (L) of the reinforcement structure 10 may be configured for any desired application. For example, the height (H) and length (L) of the reinforcement structure 10 may be adjusted based on dimensions and clearance of a vehicle (see FIG. 1). The reinforcement structure 10 includes a plurality of brackets 28 secured to the shell 12. The brackets 28 include a planar portion 30 and one or more flanges 34. The flanges 34, one or more holes 32 positioned on the brackets 28, or both may be configured to secure the reinforcement structure 10 to one or more portions of a vehicle, one or more additional components, or both.

Figure 4:
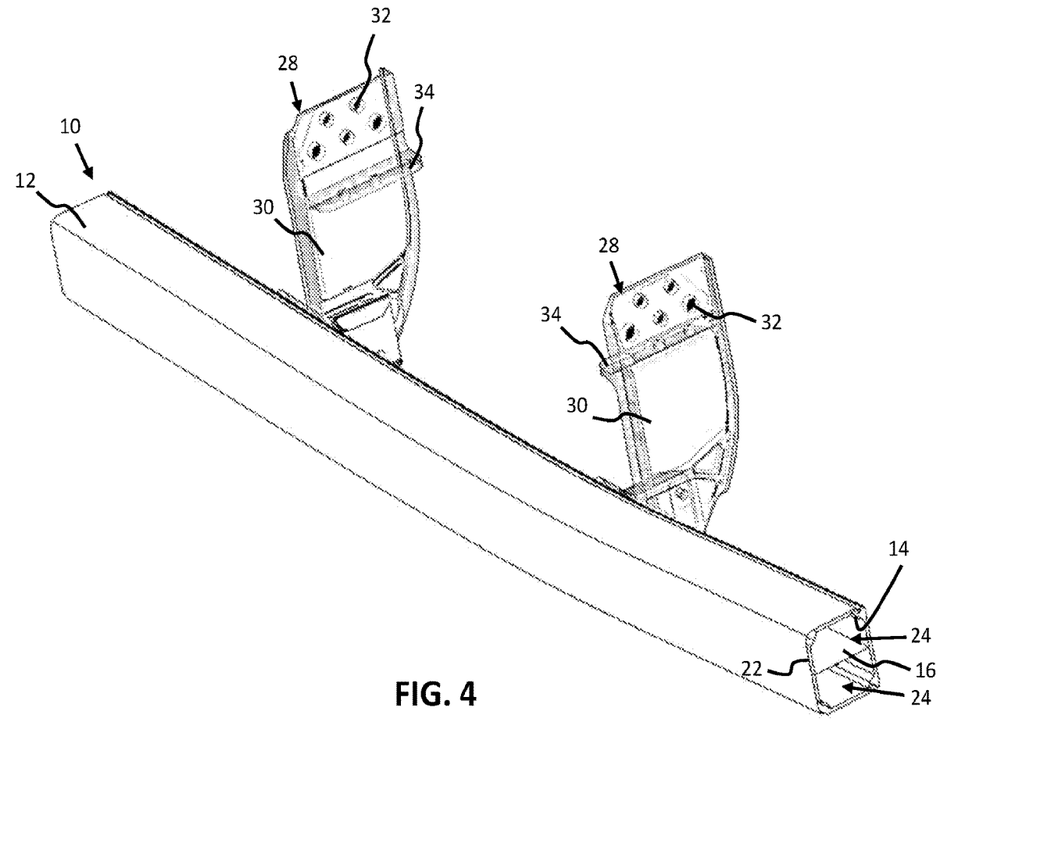
FIG. 4 is a perspective view of a reinforcement structure having a plurality of brackets.

FIG. 4 illustrates a perspective view of a reinforcement structure 10. The reinforcement structure 10 includes an inner member 14 secured within the confines of a shell 12. The inner member 14 includes a plurality of cavities 24 formed by adjoining walls 22 and one or more ribs 16 of the inner member 14. The reinforcement structure 10 includes a plurality of brackets 28 secured to the shell 12. The brackets 28 include a planar portion 30 and one or more flanges 34. The flanges 34, one or more holes 32 positioned on the brackets 28, or both may be configured to secure the reinforcement structure 10 to one or more portions of a vehicle, one or more additional components, or both.

Figure 6:
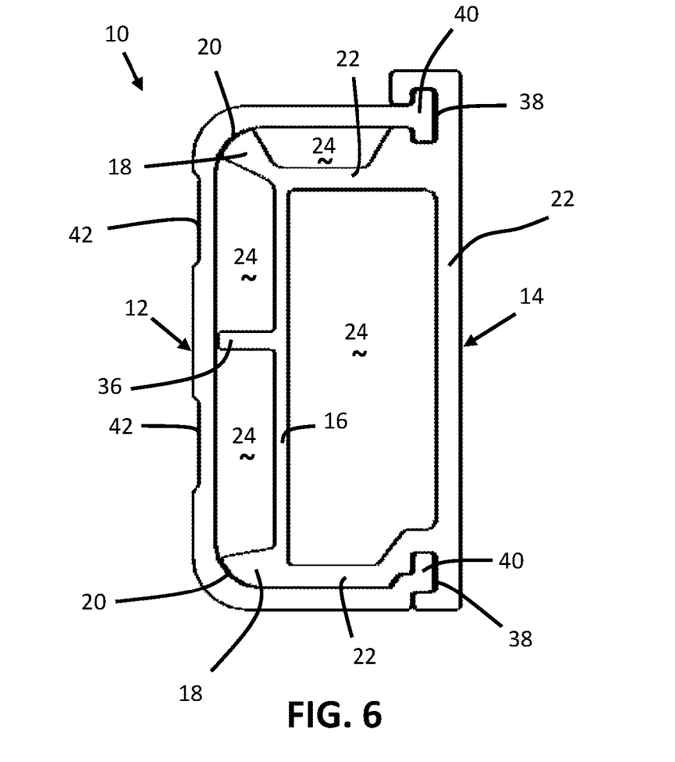
FIG. 6 is a cross-section of a reinforcement structure.

FIG. 6 illustrates a cross-section of a reinforcement structure 10. The reinforcement structure 10 includes an inner member 14 secured at least partially within the confines of a shell 12. The inner member 14 may include a plurality of abutment portions 18 that abut corresponding receiving portions 20 of the shell 12. The inner member 14 may further include a retaining feature 36 projecting from an inner rib 16 that may contact an inner portion of the shell 12 and increase structural integrity of the inner member 14. As illustrated, the inner member 14 may be connected to the shell 12 by securing fingers 40 of the shell 12 within channels 38 along the inner member 14 so that walls 22 of the inner member 14 substantially abut an inner surface of the shell 12. Once the inner member 14 and the shell 12 are connected, a plurality of cavities 24 may be formed within the reinforcement structure 10. Additionally, as shown, an outer surface of the shell 12 may include a recess 42 that extends inwardly away from the outer surface of the shell 12.

Figure 8:
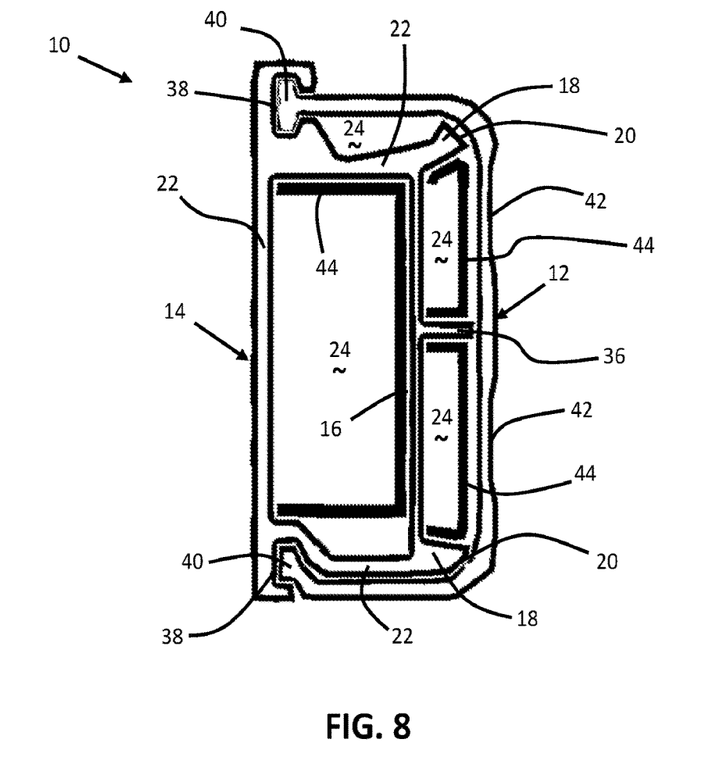
FIG. 8 is a cross-section of a reinforcement structure.

FIG. 8 illustrates a cross-section of a reinforcement structure 10. The reinforcement structure 10 includes an inner member 14 secured at least partially within the confines of a shell 12. The inner member 14 may include a plurality of abutment portions 18 that abut corresponding receiving portions 20 of the shell 12. The inner member 14 may further include a retaining feature 36 projecting from an inner rib 16 that may contact an inner portion of the shell 12 and increase structural integrity of the inner member 14. As illustrated, the inner member 14 may be connected to the shell 12 by securing fingers 40 of the shell 12 within channels 38 along the inner member 14 so that walls 22 of the inner member 14 substantially abut an inner surface of the shell 12. Once the inner member 14 and the shell 12 are connected, a plurality of cavities 24 may be formed within the reinforcement structure 10.

To further improve structural integrity of the reinforcement structure 10, one or more inserts 44 may be inserted into the cavities 24. It should be noted that while the inserts 44 may further improve performance of the reinforcement structure 10, the inserts 44 may not be needed for some applications. However, it is envisioned that the inserts 44 may advantageously be utilized in applications requiring an even stronger reinforcement structure 10. The inserts 44 may at least partially follow a contour of the inner member 14, the shell 12, or both. However, the inserts 44 may have any desired shape and/or dimensions to reinforce the cavities 24.

Additionally, as shown, an outer surface of the shell 12 may include a recess 42 that extends inwardly away from the outer surface of the shell 12.

Figure 9:
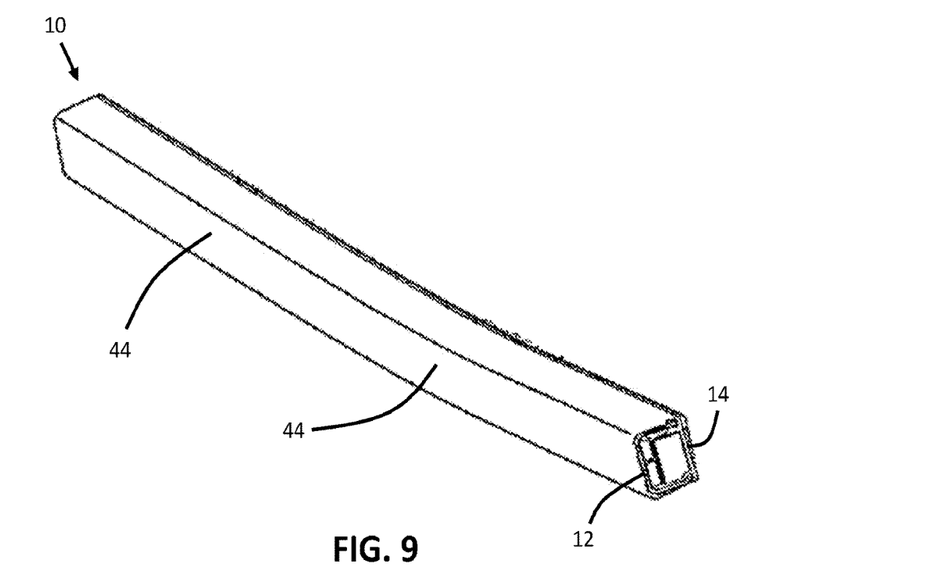
FIG. 9 is a perspective view of a reinforcement structure locally reinforced by inserts.

FIG. 9 illustrates a perspective view of a reinforcement structure 10. The reinforcement structure 10 includes an inner member 14 at least partially enclosed within a shell 12. The reinforcement structure 10 may have a cross-section similar to the cross-section shown in FIG. 6. As shown, the reinforcement structure 10 may be locally reinforced in any desired locations by one or more inserts 44. The inserts 44 may extend at least partially along a length of the reinforcement structure 10 to form the cross-section as shown in FIG. 8. It is envisioned that the inserts 44 are only located in localized regions of the reinforcement structure 10 that may be determined as weak points relative to the remaining portions of the reinforcement structure 10. The inserts 44 may be inserted into the reinforcement structure 10 during assembly and/or after assembly of the reinforcement structure 10. The inserts 44 may be a secondary piece inserted between the shell 12 and the inner member 14 before securing the inner member 14 to the shell 12. The inserts 44 may also be co-extruded and/or co-pultruded with the reinforcement structure 10 at desired intervals to locally reinforce the reinforcement structure 10. While local reinforcement is shown, it should also be noted that the inserts may extend along substantially all of a length of the reinforcement structure 10 if desired. Additionally, while a plurality of inserts 44 are illustrated, the reinforcement structure 10 may include any number of inserts 44. For example, the reinforcement structure 10 may include a single insert 44 or may be free of any inserts 44. Therefore, advantageously, the reinforcement structure 10 may be even further tunable for any given application by modifying the location and number of inserts 44.

ILLUSTRATIVE EXAMPLE 1

Conventional steel reinforcement structures and reinforcement structures according to the structure cross-section exemplified in FIG. 2 were analyzed using CAE software. The structure and weights of each structure are illustrated below in Table 1.

TABLE 1

| Reinforcement Structure Material | Connection Method to Vehicle | Reinforcement Structure Mass (kg) | Bracket Mass (kg) | Total Mass (kg) |
|---|---|---|---|---|
| Steel (E450) | Mechanical Fasteners | 37.43 | 12 | 49.43 |
| Composite material having overall thickness of about 2-12 mm. Construction geometry as shown in FIG. 2 | Mechanical Fasteners | 13.6 | 13.1 | 26.7 to 27 |

Figure 5:
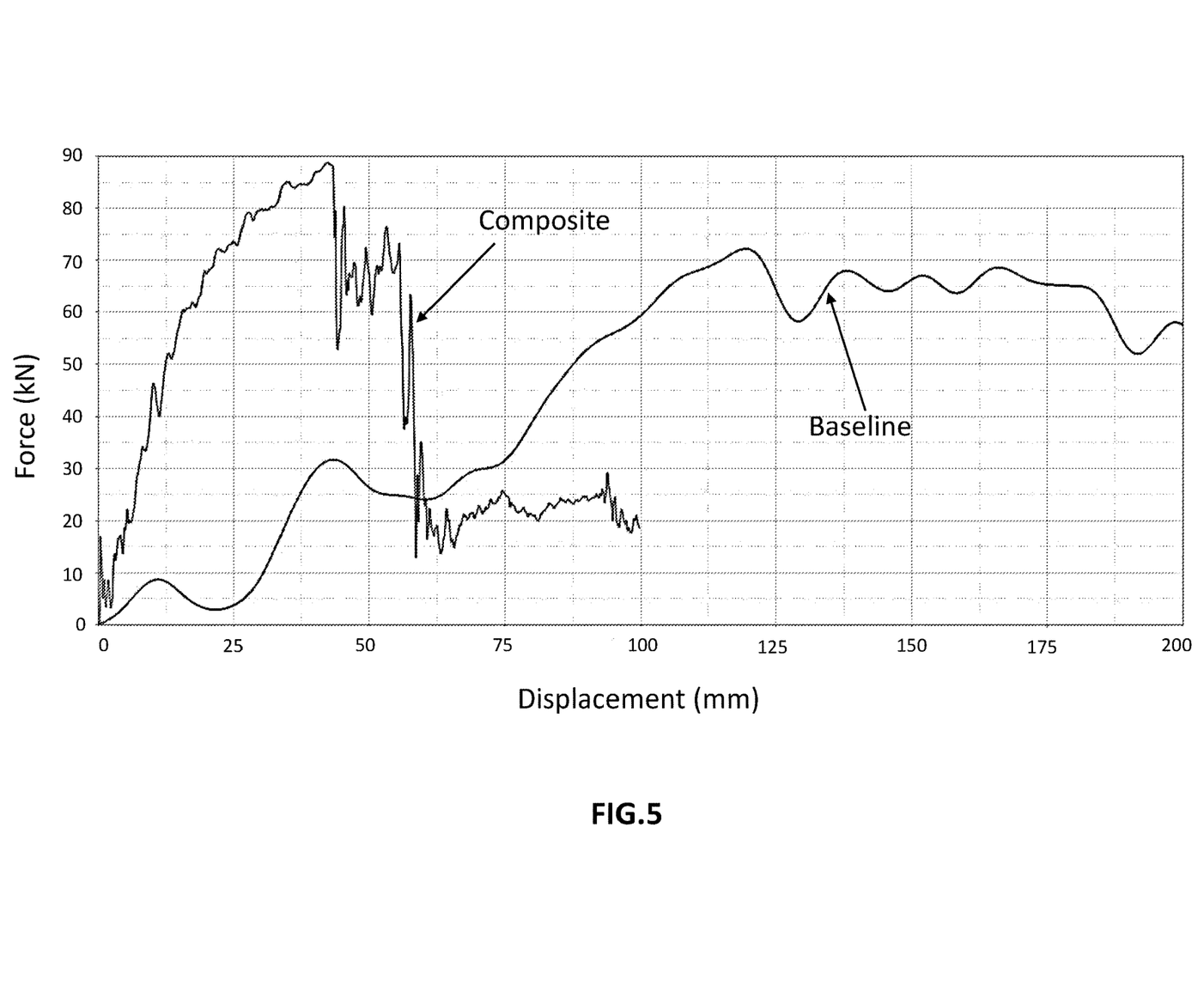
FIG. 5 illustrates the load and stiffness capabilities of Illustrative Example 1.

As shown in Table 1 and FIG. 5, the composite reinforcement structure is lighter than the steel reinforcement structure while also providing improved stiffness and loading capabilities.

ILLUSTRATIVE EXAMPLE 2

Conventional steel reinforcement structures and reinforcement structures according to the structure cross-section exemplified in FIG. 6 were analyzed using CAE software. The structure and weights of each structure are illustrated below in Table 2.

TABLE 2

| Reinforcement Structure Material | Connection Method to Vehicle | Reinforcement Structure Mass (kg) | Bracket Mass (kg) | Total Mass (kg) |
|---|---|---|---|---|
| Steel (E450) | Mechanical Fasteners | 37.43 | 12 | 49.43 |
| Composite material having overall thickness of about 2-12 mm. Construction geometry as shown in FIG. 6 | Mechanical Fasteners | 11.07 | 13.1 | 24.17 to 24.47 |

Figure 7:
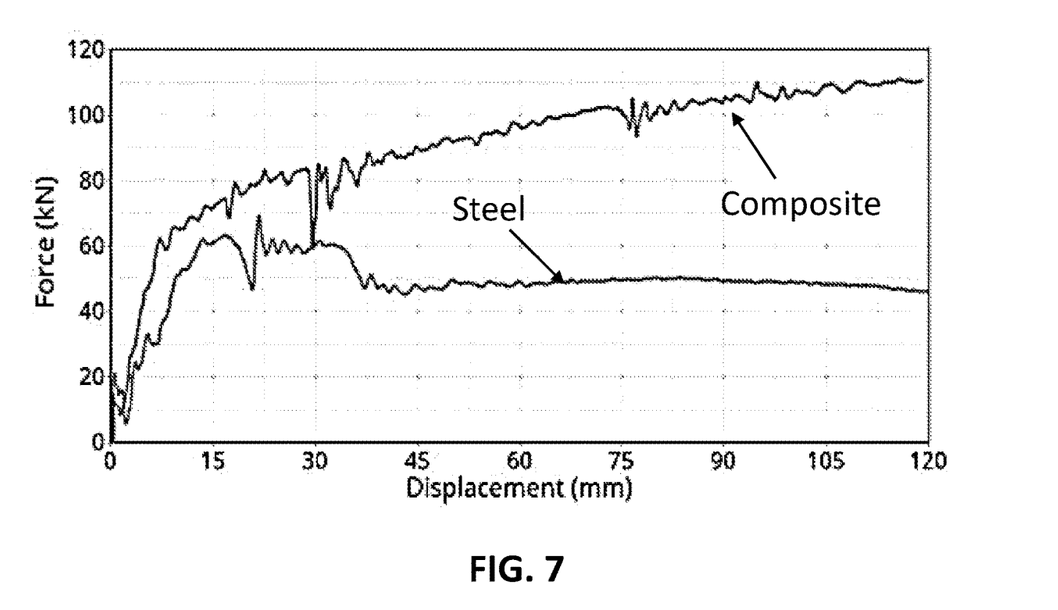
FIG. 7 illustrates the load and stiffness capabilities of Illustrative Example 2.

As shown in Table 2 and FIG. 7, the composite reinforcement structure is lighter than the steel reinforcement structure while also providing improved stiffness and loading capabilities.

ILLUSTRATIVE EXAMPLE 3

Conventional steel reinforcement structures and reinforcement structures according to the structure cross-sections exemplified in FIGS. 6 and 8 were analyzed using CAE software. The structure and weights of the conventional baseline steel reinforcement design and the reinforcement structure having a cross-section as shown in FIG. 6 (free of inserts) are illustrated above in Table 2. Additionally, a reinforcement structure having a cross-section as shown in FIG. 8 with a plurality of inserts was tested.

Figure 10:
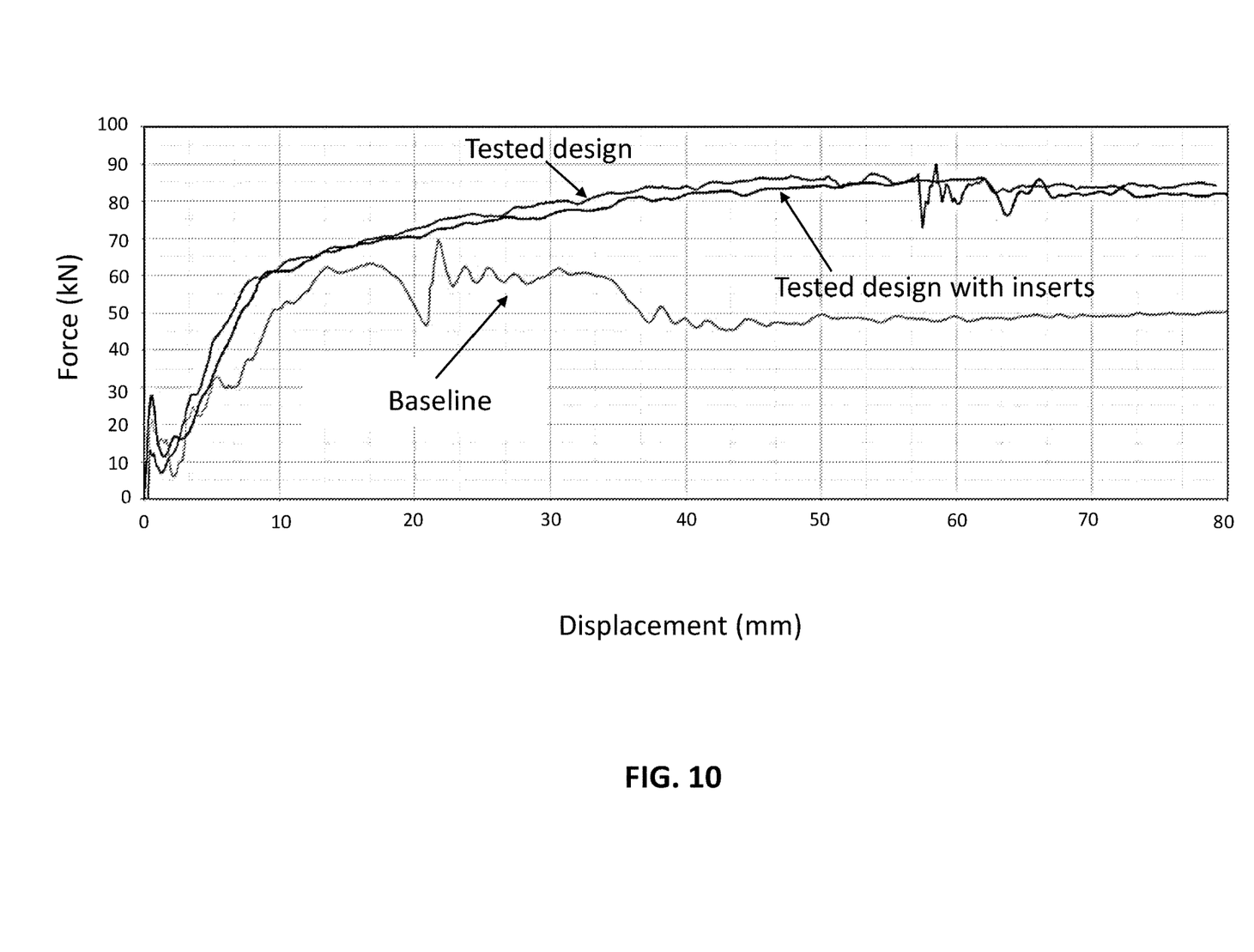
FIG. 10 illustrates the load and stiffness capabilities of Illustrative Example 3.

As shown in Table 2 and FIG. 10, the composite reinforcement structure without inserts is lighter than the steel reinforcement structure while also providing improved stiffness and loading capabilities. Furthermore, as illustrated in FIG. 10, the reinforcement structure with the plurality of inserts also provided improved stiffness and loading capabilities when compared to the conventional steel reinforcement structure.

It should be noted that any features disclosed herein may be configured in a variety of combinations. For example, while the abutment portion and the retaining feature may be located along the shell, it is also contemplated that the abutment portion, the retaining feature, or both may also be located along the inner member. Similarly, the rib, notch, cavity, receiving feature, or a combination thereof may be located along the shell, the inner member or both. As such, it is envisioned that the present teachings may utilize the features described to create a reinforcement structure illustrated herein.

REFERENCE LIST

10 Reinforcement Structure
12 Shell
14 Inner Member
16 Rib
18 Abutment Portion
20 Receiving Portion
22 Wall
24 Cavity
26 Notch
28 Bracket
30 Planar Portion
32 Hole
34 Flange
36 Retaining Feature
38 Channel
40 Finger
42 Recess
44 Insert
50 Vehicle
L Length (of the Reinforcement Structure)
H Height (of the Reinforcement Structure)

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A reinforcement structure comprising:
    an inner member at least partially secured within a shell; and
    one or more brackets secured to the shell, the one or more brackets including one or more projections configured to mount the reinforcement structure to one or more additional structures;
    wherein the inner member is secured within the shell so that one or more abutment portions of the shell or inner member are positioned in receiving portions of the inner member or shell, respectively, to create at least a partial press-fit condition between the inner member and the shell;
    wherein the inner member includes one or more cavities formed by one or more walls of the inner member; and
    wherein the inner member includes one or more ribs projecting from the one or more walls to further define the one or more cavities.

2. The reinforcement structure according to claim 1, wherein the shell includes a plurality of retaining features that contact an outer surface of the inner member to maintain the at least partial press-fit condition between the shell and the inner member.

3. A reinforcement structure comprising:
    an inner member at least partially secured within a shell;
    wherein the inner member is secured within the shell so that one or more abutment portions of the shell or inner member are positioned in receiving portions of the inner member or shell, respectively, to create at least a partial press-fit condition between the inner member and the shell;

wherein the inner member includes one or more cavities formed by one or more walls of the inner member;

wherein the inner member includes one or more ribs projecting from the one or more walls to further define the one or more cavities; and wherein the shell, the inner member, or both are a fiber-reinforced composite material that contains one or more adhesive components.

4. The reinforcement structure according to claim 3, wherein the reinforcement structure includes one or more brackets secured to the shell, the one or more brackets including one or more projections configured to mount the reinforcement structure to one or more additional structures.

5. The reinforcement structure according to claim 3, wherein the shell includes a plurality of retaining features that contact an outer surface of the inner member to maintain the at least partial press-fit condition between the shell and the inner member.

6. The reinforcement structure according to claim 5, wherein the retaining features are a plurality of undulations along an inner surface of the shell.

7. The reinforcement structure according to claim 3, wherein the shell is a monolithically formed, enclosed structure having opposing openings at terminal ends of the shell.

8. The reinforcement structure according to claim 3, wherein the shell includes one or more notches recessed from an outer surface of the shell.

9. The reinforcement structure according to claim 3, wherein the shell and the inner member are co-pultruded or co-extruded.

10. The reinforcement structure according to claim 3, wherein the one or more ribs is a single rib extending between opposing walls of the inner member to form a pair of cavities.

11. The reinforcement structure according to claim 3, wherein the inner member is further secured to the shell by a male portion of the shell or the inner member being positioned within a female portion of the inner member or shell, respectively.

12. The reinforcement structure according to claim 11, wherein the male portion is a finger secured and the female portion is a channel.

13. The reinforcement structure according to claim 12, wherein the male portion and the female portion are co-extruded.

14. A reinforcement structure comprising:

an inner member at least partially secured within a shell;

wherein the inner member is secured within the shell so that one or more abutment portions of the shell or inner member are positioned in receiving portions of the inner member or shell, respectively, to create at least a partial press-fit condition between the inner member and the shell;

wherein the inner member includes one or more cavities formed by one or more walls of the inner member; and wherein the one or more cavities include an insert that locally reinforces the reinforcement structure.

15. The reinforcement structure according to claim 14, wherein the insert extends locally along a length of the reinforcement structure.

16. The reinforcement structure according to claim 15, wherein the insert extends along an entire length of the reinforcement structure.

17. The reinforcement structure according to claim 15, wherein the insert extends along only a portion of a length of the reinforcement structure.

18. The reinforcement structure according to claim 14, wherein the insert is co-extruded, co-pultruded, or both with the shell, the inner member, or both.

19. The reinforcement structure according to claim 14, wherein the insert is positioned between the shell and the inner member prior to securing the inner member to the shell.

20. The reinforcement structure according to claim 14, wherein the inner member includes one or more ribs projecting from the one or more walls to further define the one or more cavities.

\* \* \* \* \*